US008694910B2

(12) United States Patent
Lambourne et al.

(10) Patent No.: US 8,694,910 B2
(45) Date of Patent: Apr. 8, 2014

(54) USER INTERFACE TO ENABLE USERS TO SCROLL THROUGH A LARGE LIST OF ITEMS

(75) Inventors: Robert A. Lambourne, Santa Barbara, CA (US); Steve Holmgren, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 647 days.

(21) Appl. No.: 11/382,272

(22) Filed: May 9, 2006

(65) Prior Publication Data

US 2013/0254707 A1 Sep. 26, 2013

(51) Int. Cl.
*G06F 3/048* (2013.01)

(52) U.S. Cl.
USPC ............. 715/784; 715/783; 715/712; 715/77; 715/862

(58) Field of Classification Search
USPC ..................... 715/783–784, 712, 776, 855
See application file for complete search history.

(56) References Cited

U.S. PATENT DOCUMENTS

| | | | | |
|---|---|---|---|---|
| 5,848,410 | A * | 12/1998 | Walls et al. ........................... | 1/1 |
| 5,859,638 | A * | 1/1999 | Coleman et al. ............... | 715/786 |
| 6,288,718 | B1 * | 9/2001 | Laursen et al. ................ | 715/800 |
| 6,971,069 | B2 * | 11/2005 | Laiho et al. .................... | 715/830 |
| 7,305,624 | B1 * | 12/2007 | Siegel ............................ | 715/738 |
| 7,890,520 | B2 * | 2/2011 | Tsukazaki et al. ............ | 707/754 |
| 7,958,456 | B2 * | 6/2011 | Ording et al. ................. | 715/784 |
| 2002/0147977 | A1* | 10/2002 | Hammett et al. ............... | 725/47 |
| 2003/0013493 | A1* | 1/2003 | Irimajiri et al. ............... | 455/566 |
| 2004/0100479 | A1* | 5/2004 | Nakano et al. ................ | 345/700 |
| 2004/0113952 | A1* | 6/2004 | Randall ......................... | 345/830 |
| 2004/0252119 | A1* | 12/2004 | Hunleth et al. ............... | 345/440 |
| 2005/0154988 | A1* | 7/2005 | Proehl et al. .................. | 715/720 |
| 2006/0026535 | A1* | 2/2006 | Hotelling et al. ............. | 715/863 |
| 2006/0036942 | A1* | 2/2006 | Carter ........................... | 715/526 |
| 2006/0095848 | A1* | 5/2006 | Naik ............................. | 715/716 |
| 2006/0123357 | A1* | 6/2006 | Okamura ...................... | 715/786 |
| 2006/0161870 | A1* | 7/2006 | Hotelling et al. ............. | 715/863 |
| 2006/0161871 | A1* | 7/2006 | Hotelling et al. ............. | 715/863 |
| 2006/0184901 | A1* | 8/2006 | Dietz ............................ | 715/855 |
| 2006/0218209 | A1* | 9/2006 | Arrouye et al. .............. | 707/203 |
| 2006/0271870 | A1* | 11/2006 | Anwar .......................... | 715/764 |
| 2006/0282858 | A1* | 12/2006 | Csicsatka et al. ............. | 725/52 |
| 2007/0016314 | A1* | 1/2007 | Chan et al. .................... | 700/94 |
| 2007/0083822 | A1* | 4/2007 | Robbin et al. ................ | 715/786 |

(Continued)

OTHER PUBLICATIONS

Myers et al.; Taking Handheld Devices to the Next Level; © 2002; IEEE; p. 36-43.*

(Continued)

*Primary Examiner* — Linh K Pham
(74) *Attorney, Agent, or Firm* — Hanley, Flight and Zimmerman, LLC (57) ABSTRACT

Techniques pertaining to efficient scrolling are disclosed. One of the features of the efficient scrolling is the enablement of a search right at an appropriate item in a large list of items, thus avoiding going through the long list and wandering back and forth around a desired item. According to one embodiment, an indexing display is used. The indexing display includes a list of indexes, each corresponding to a group of items that sharing one or more common characteristics (e.g., a character or a kind). The indexing display is allowed first to be scrolled for a desired index. Once the desired index is confirmed, searching for a desired item in the large list starts at an item indexed by the desired index.

18 Claims, 6 Drawing Sheets

(56) References Cited

U.S. PATENT DOCUMENTS

| | | |
|---|---|---|
| 2007/0132789 A1* | 6/2007 | Ording et al. .................. 345/684 |
| 2007/0150830 A1* | 6/2007 | Ording et al. .................. 715/784 |
| 2007/0156648 A1* | 7/2007 | Bridges et al. .................... 707/3 |
| 2007/0168875 A1* | 7/2007 | Kowitz et al. .................. 715/764 |
| 2007/0236475 A1* | 10/2007 | Wherry .......................... 345/173 |
| 2007/0248311 A1* | 10/2007 | Wice et al. ....................... 386/52 |
| 2008/0040687 A1* | 2/2008 | Randall ......................... 715/830 |

OTHER PUBLICATIONS

Burns et al; A Graphical Entity-Relationship Database Browser; © 1988; IEEE; pp. 694-704.*

Perry et al; Of Mice and Menus; Designing the User-Friendly Interface; © 1989; IEEE; pp. 46-51.*

* cited by examiner

FIG. 1

Prior Art

USER INTERFACE TO ENABLE USERS TO SCROLL THROUGH A LARGE LIST OF ITEMS

BACKGROUND OF THE INVENTION

1. Field of the Invention

The invention is generally related to the area of man machine interface. In particular, the invention is related to method and apparatus for effectively scrolling through a large list of items.

2. The Background of Related Art

The most popular use of a scroll wheel may be probably found on an Apple's iPod. A scroll wheel of an iPod allows a user to scroll where he/she desires. Thus a user can choose songs to play on from lists of artists, albums, composers, genres, or tracks.

The underlying mechanism of a scroll wheel is a software module being executed to convert a physical motion of the user moving his/her finger over the scroll wheel to a highlight bar on a list of music items. The software module is configured based on the concept of 'acceleration'. In simple terms, this means that the faster the user turns the scroll wheel, the faster the list on the screen will scroll. This is very effective in allowing users to traverse long lists.

There are, however, at least two problems observed. First, it still takes a long time to get through a large list of music items. For example, if a desired item is an item No. 1500 in a list of 2000 songs, a user has to go through the first 1499 items before reaching the item No. 1500. Second, when a list is scrolled fast, it is very hard for the user to stop at the desired position without overshooting. For example. If the list is showing an artist named "Abba", and the user wants to scroll to an artist named "Sting", he/she must turn the scroll wheel fast in order to get from Abba to S's quickly. But because the list is long and so being scrolled fast, it is very easy to overshoot the list and get to the T's or U's by moving his/her finger on the scroll wheel too fast.

It is commonly accepted that a scroll wheel is a convenient mechanism to scroll through a list. Thus, there is a need for solutions that can facilitate a user to readily reach to a desired item in a long list.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to power scrolling that facilitates a search right at an appropriate item, thus avoiding going through a long list and wandering back and forth around a desired item. According to one aspect of the present invention, an indexing display is used. The indexing display includes a list of indexes, each corresponding to a group of items sharing one or more common characteristics (e.g., a character or a kind). The indexing display is allowed first to be scrolled for a desired index. Once the desired index is confirmed, searching for a desired item in the large list starts at an item indexed by the desired index.

The present invention may be implemented in many forms including software, hardware or a combination of both as a method and apparatus. According to one embodiment, the present invention is a method for scrolling a large list of items, the method comprises showing an indexing display that includes a list of indexes, each corresponding to a group of items that sharing one or more common characteristics; scrolling in the indexing display for a desired index; and scrolling in the large list when the desired index is confirmed, wherein the scrolling in the large list starts at an item indexed by the desired index.

Depending on implementation, the large list may be sorted or unsorted. Thus the item indexed by the desired index may be a first one of a group of items indexed by the desired index, or a first one in the large list that is indexed by the desired index.

According to another embodiment, the present invention is an apparatus for displaying a list of items, the apparatus comprises: a display screen, a screen driver configured to display the large list on the display screen, a scroll wheel allowing scrolling in the list being displayed, a memory for storing code, a processor executing the code to perform operations of: showing an indexing display that includes a list of indexes, each corresponding to a group of items that sharing one or more common characteristics; scrolling in the indexing display for a desired index; and scrolling in the large list when the desired index is confirmed, wherein the scrolling in the large list starts at an item indexed by the desired index.

One of the objects, features, and advantages of the present invention is to provide solutions of effectively scrolling through a large list of items.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The detailed description of the present invention is presented largely in terms of procedures, steps, logic blocks, processing, or other symbolic representations that directly or indirectly resemble the operations of devices or systems that can be used on networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
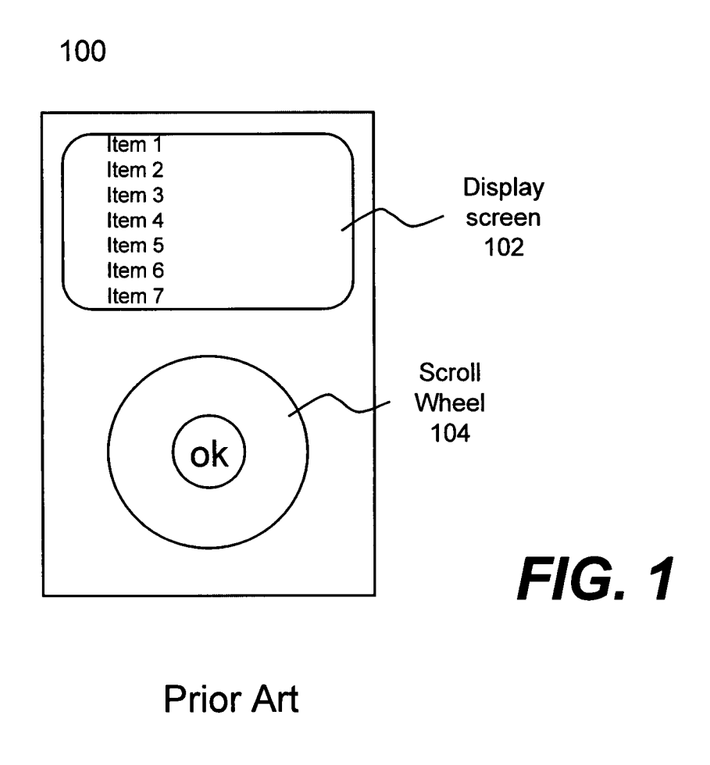
FIG. 1 shows an exemplary configuration in which the present invention may be practiced.

Referring now to the drawings, in which like numerals refer to like parts throughout the several views. FIG. 1 shows a front view of an Apple iPod 100 that includes a display screen 102 and a scroll wheel 104. A user may put a finger on the scroll wheel 104 to navigate a list being displayed in the screen 102 by moving the finger clockwise or counterclockwise. An acceleration of the finger movement would control a navigating speed of the list. Because the display screen 102 is relatively small, a search of an item down in the list would often overpass the item, resulting in repeated wandering back and forth around the item.

Figure 2A:
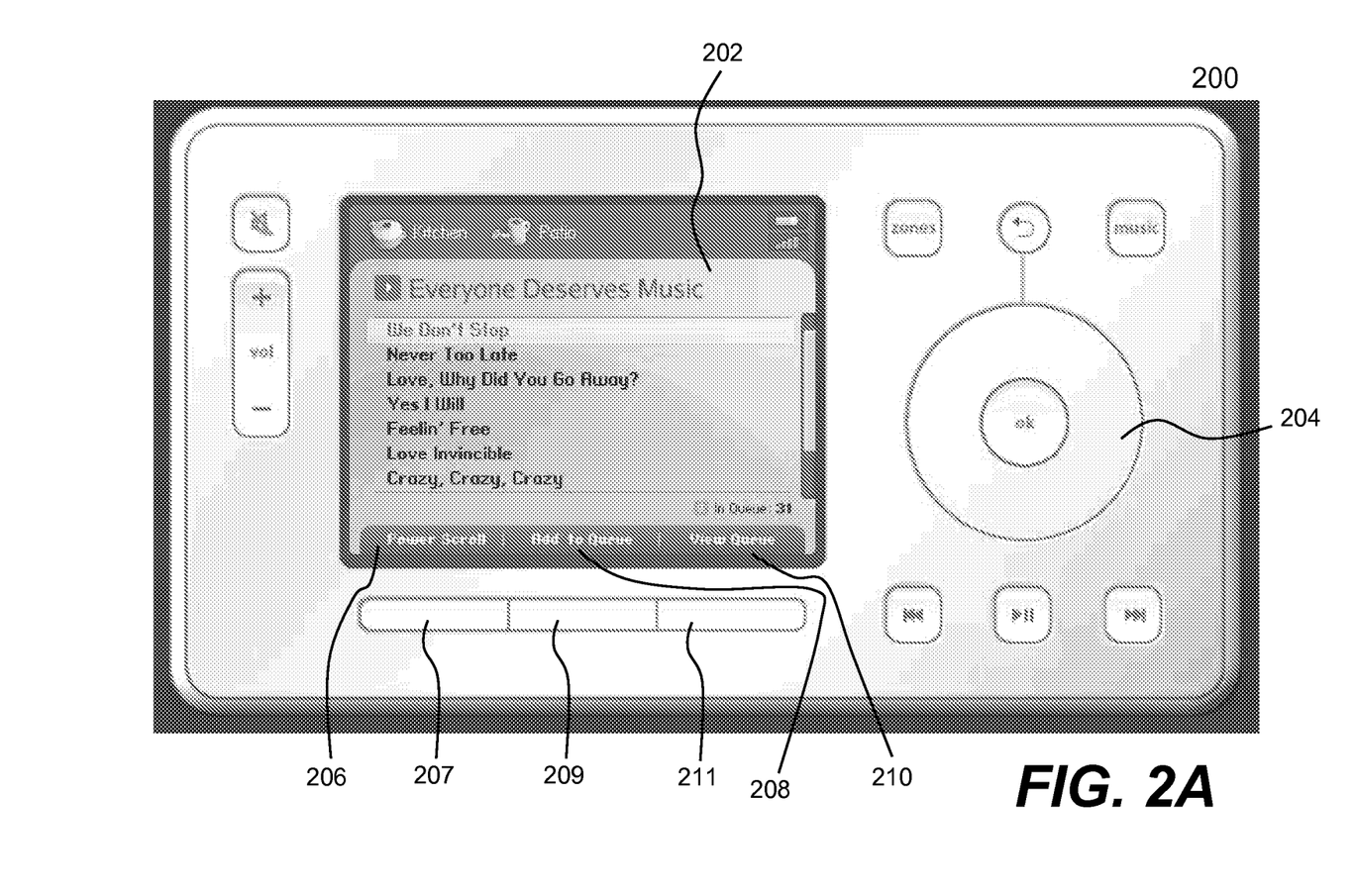
FIG. 2A shows an exemplary device in which the present invention is implemented according to one embodiment of the present invention.

FIG. 2A shows an exemplary device 200 in which the present invention is implemented according to one embodiment of the present invention. The device 200 includes a display screen 202 and a scroll wheel 204. Different from the device shown in FIG. 1, the display screen 202 includes a number of soft keys 206, 208, and 210 that can be respectively activated by buttons 207, 209, and 211. One of the soft keys 206 is labeled as "power scroll" that can be activated to start what is referred to herein as power scrolling. The soft key 206 may be activated by other means (e.g., touch screen). One of the features of the power scrolling is the underlying mechanism that provides a narrowed searching range from which a desired item may be readily located in a large list of items that may be provided locally or remotely.

Figure 2B:
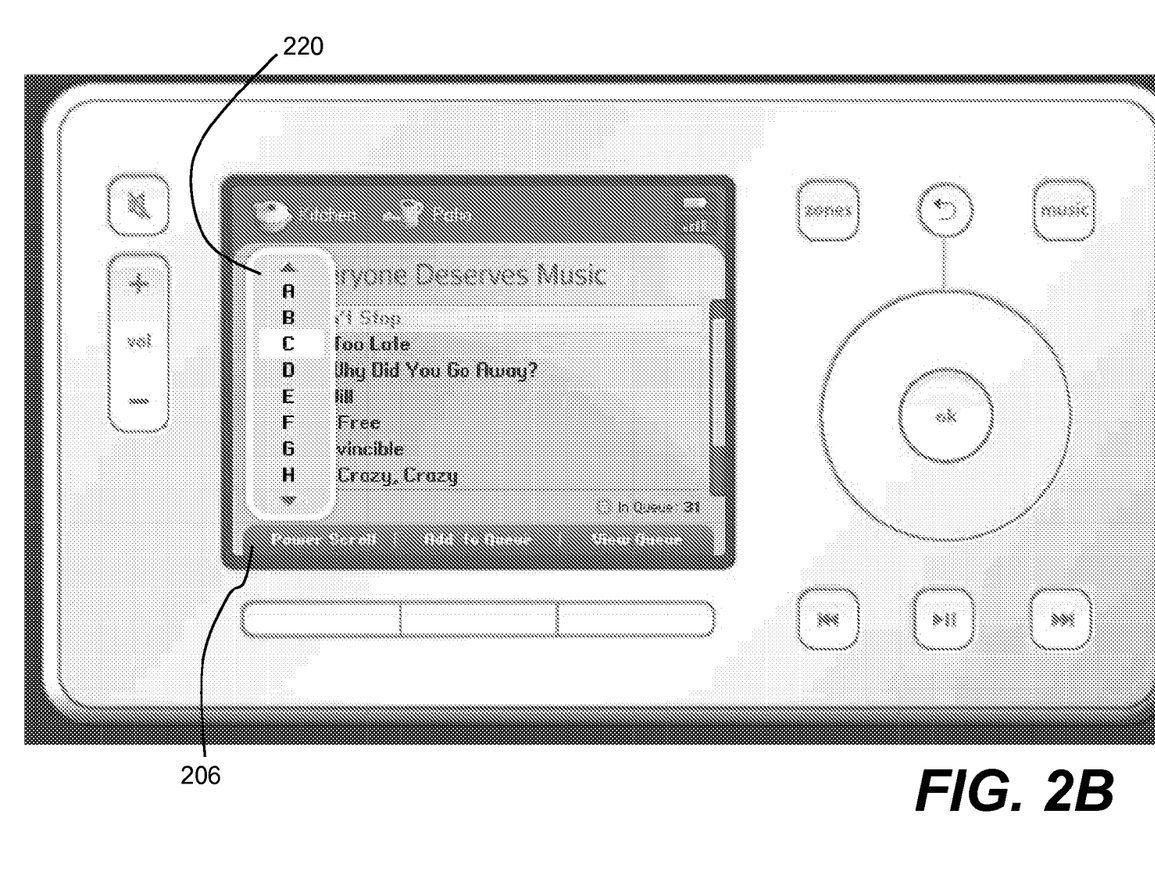
FIG. 2B shows that, after the power scroll key is activated, a display, referred to herein as an indexing display, is popped up or displayed.

FIG. 2B shows that, after the power scroll key 206 is activated, a display 220, referred to herein as an indexing display, is popped up or displayed. As used herein, it is defined that a display screen or a screen is a physical display apparatus in a device, such as the display screen 202 of FIG. 2A, while a screen display or simply a display is an image presented on a display screen. According to one embodiment, the indexing display 220 is superimposed onto a displayed portion of a list of items. In another embodiment, the indexing display 220 is displayed on a side of a displayed portion of a list of items.

In any case, the indexing display 220 provides a list of indexes, each configured to cover a predefined range or a group of items sharing a common feature. As shown in the figure, the indexing display 220 shows a list of alphabets, each of the alphabets covers words or letters that begin with the corresponding alphabet. In operation, a user uses the scroll key 204 to scroll to a desired alphabet in the indexing display 220 that then leads to the beginning, middle or ending of a list of items that begin with the desired alphabet. As a result, a user does not have to scroll from the beginning of a list of items all the way to a desired item. With the power scrolling, the user now is able to "jump" to a right starting point and navigate in a much narrowed list for the desired item.

Figure 2C:
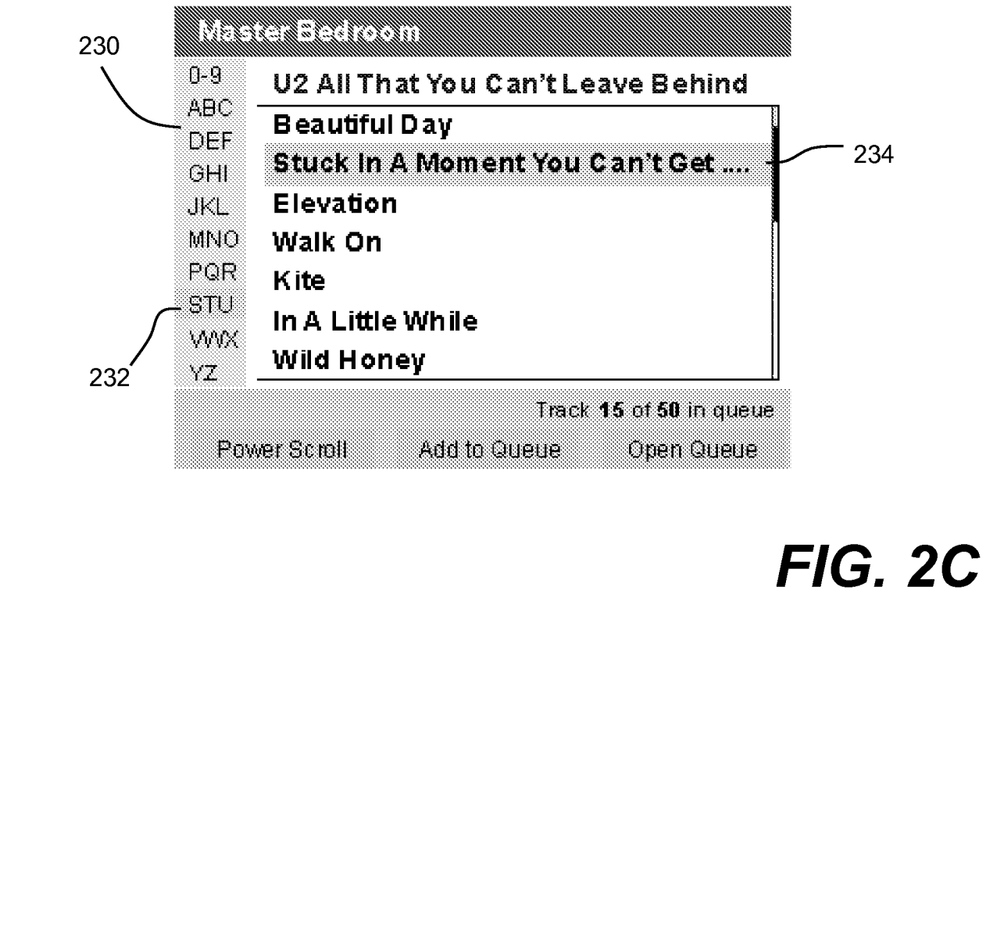
FIG. 2C shows another embodiment of the indexing display that shows a list of grouped indexes.

FIG. 2C shows another embodiment of the indexing display 230 that shows a list of grouped indexes. Instead of having one index for one type of items, one or more indexes are grouped as a grouped index such that all items in a list that begin with any index in one grouped index are associated with the grouped index. As shown in the figure, a grouped index "STU" 232 includes three characters and is selected, which leads to the beginning of items that are started with any of the characters "S", "T", and "U". As a result, a user does not have to go through items that begin with characters "A", "B", . . . or "R", and jump right into the items beginning with the characters "S", "T", or "U". In one embodiment in which the list is not sorted, as shown in FIG. 2C, the next item that the highlight 234 moves to is an item starting with any of the characters "S", "T", and "U". In other words, the scrolling bar 234 is configured to move either linearly or nonlinearly in accordance with a selection in the indexing display.

FIG. 2B and FIG. 2C show two examples of indexing characters. It should be noted that an indexing display is not necessary to display only the first character of a word, a phrase or a string. Depending on application, an article, such as "a" or "the" may not be indexed at all, in which case, a next word may be used for indexing purpose. It can also be appreciated that the power scrolling may be used in other categories. For example, a list of items may be organized in terms of characteristics, each of the characteristics is indexed by a label, or one or more of the characteristics are indexed by a grouped label. When the power scrolling is on, a set of desired characteristics in a long list can be readily located by the indexing display, where the indexing display provides a list of labels or grouped labels for limited scrolling.

According to one embodiment, a list of songs is organized in terms of genre (e.g., classic, jazz, Latin, pop, Rock . . . ). Each category may contain numerous songs. Going through the list all the way to a particular song in Rock can be tedious and experience the overshooting. With the power scrolling, the indexing display shows a list of the genre and provides means for jumping right into a desired category from which a desired song is readily located.

According to one embodiment, after an index is selected, an item highlighted in a list can be either a first one or a last one in the category or group indexed by the selected index. When the first one is highlighted in a display screen, a last item of a preceding group is also displayed in the display screen. When the last one is highlighted in a display screen, a first item of a following group is also displayed in the display screen.

Figure 3:
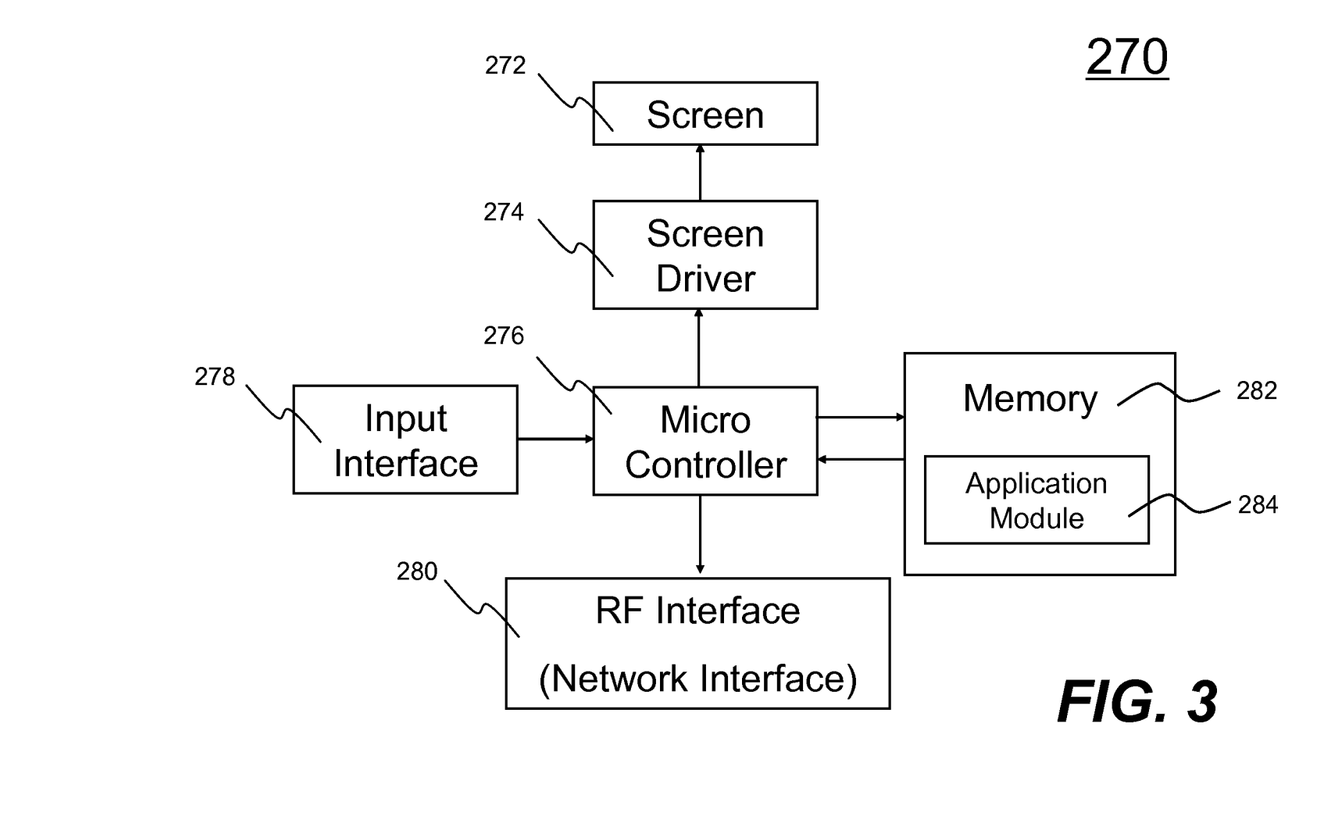
FIG. 3 illustrates an internal functional block diagram of an exemplary portable device.

The power scrolling may be implemented in a device with a display screen. FIG. 3 illustrates an internal functional block diagram of an exemplary controller 270. The screen 272 on the controller 270 may be a LCD screen. The screen 272 communicates with and is commanded by a screen driver 274 that is controlled by a microcontroller (e.g., a processor) 276. The memory 282 may be loaded with one or more application modules 284 that can be executed by the microcontroller 276 with or without a user input via the user interface 278 to achieve desired tasks. In one embodiment, an application module contemplating the power scrolling and enabling one or more soft keys is loaded in the memory 282.

The controller 270 includes a network interface 280 referred to as a RF (Radio Frequency) interface 280 that facilitates wireless communication with another device being controlled by the controller 270 via a corresponding wireless interface or RF interface thereof.

Figure 4:
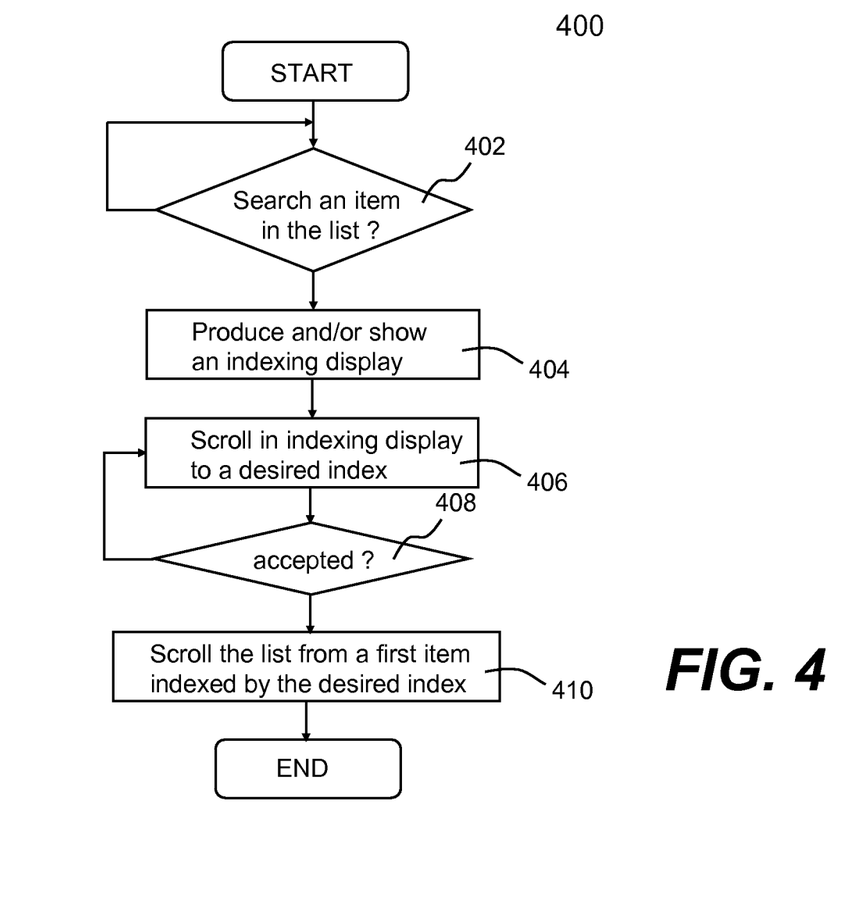
FIG. 4 shows a flowchart of scrolling a list of items in accordance with one embodiment of the present invention.

Referring now to FIG. 4, there shows a flowchart 400 of scrolling a list of items in accordance with one embodiment of the present invention. The flowchart 400 may be implemented in software, hardware or in a combination of both as a method, an apparatus or a part of a system. A list, typically containing many items, is displayed in a display screen. It can be appreciated to those skilled in the art that a list can be a collection of any items. To facilitate the understanding of the present invention, a list is considered a library of songs and each item is a song. The list is otherwise scrollable by a scroll wheel.

At 402, a user decides to look for an item in the list. Instead of starting scrolling the list, the user activates an indexing display that shows a list of indexes, each indexing a group of items that share one or more common features. In one example, the items in the group are all started with an identical character. In another example, the items in the group are started with one of limited number characters (e.g., three characters). In still another example, the items in the group belong to one category or kind.

In one embodiment, the list being displayed in an indexing display is pre-generated. If there is an index in the list that does not correspond to any item, an item that is closest to an item that would be otherwise indexed by the index is chosen. For example, an index "C" in the indexing display happens to be selected by a user while the underlying list does not have any items that are started with "C", in which case, either a last item in a group started with "B" or a first item in a group started with "D" is chosen. In another embodiment, the list being displayed in an indexing display is generated whenever this is an updated to the list of all items. At 406, the scroll wheel is associated with the indexing display such that the scrolling function now only applies to the indexing display. The user can quickly locate a desired index in the indexing display because the list in the indexing display is often short. At 408, if the located index is not the desired one, the process 400 goes back to 406 to allow the user continue looking for the desired one.

It is assumed that the located index is the desired one, the process 400 now goes to 410 where the scroll wheel is now associated with the list of all items. But the desired index brings a starting point right onto a very first item that is indexed by the desired index. From the starting point, the user can scroll the wheel to locate a desired item.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. For example, the power scrolling or the indexing display may be activated by means other than a soft key. When activated, multiple indexing displays may be displayed, provided that there are multiple indexing displays (e.g., one for one type of indexing). A scroll wheel is activated to scroll through the multiple indexing displays first before becoming associated with a selected indexing display. The power scrolling may also be automatically disabled when a list of items is short (e.g., less than 20 items or accommodative in a few displays). Accordingly, the scope of the present invention is defined by the appended claims rather than the forgoing description of embodiments.

We claim:

1. A method for scrolling a list of items on a display screen of a portable device with a user interface for scrolling by user touch, the method comprising:
    showing on the display screen the list of items, the list of items representing a selection of items for playback at a playback device separate from and controlled by the portable device via a wireless interface;
    displaying on the display screen an indexing display that comprises a plurality of grouped indexes, each of the grouped indexes corresponding to items in the list of items that share one or more common characteristics, wherein the indexing display is displayed in relation to the list of items;
    facilitating a user scrolling on the user interface through the indexing display to select a desired grouped index; and
    responsive to selecting the desired grouped index, displaying on the display screen an updated list of items based on the desired grouped index to show items in the list of items corresponding to the desired grouped index and at least one item corresponding to an unselected grouped index;
    wherein displaying the updated list of items includes highlighting either a first item or a last item in the desired grouped index, wherein when the first item in the desired index is highlighted, then the at least one item corresponding to an unselected grouped index includes a last item in a preceding index, and, when the last item in the desired grouped index is highlighted, then the at least one item corresponding to an unselected grouped index includes a first item in a following grouped index, and wherein selection of an item is used by a portable device to configure the playback device to play the selected item.

2. The method as recited in claim 1, further comprising displaying the list of items in a display screen of the portable device, wherein an item is locatable when a user scrolls though the list one at a time but the user lands closer to the item by the desired grouped index.

3. The method as recited in claim 2, wherein the showing of the indexing display comprises associating the user interface with the indexing display such that a movement on the user interface causes scrolling in the indexing display.

4. The method as recited in claim 3, wherein the indexing display is on one side of the list.

5. The method as recited in claim 3, wherein the indexing display is activated by a user.

6. The method as recited in claim 3, wherein the indexing display is activated via a soft key.

7. The method as recited in claim 1, wherein the user interface and the predefined key are both disposed adjacent to the display screen.

8. The method as recited in claim 1, wherein an item indexed by the desired grouped index is indexed by any one of the one or more indexes associated with the desired grouped index.

9. The method as recited in claim 1, wherein the list is sorted and an item indexed by the desired grouped index is a first one or a last one of a group of items indexed by the desired grouped index.

10. The method as recited in claim 9, wherein the group of items is indexed by an artist, an album, a composer, a genre, or a type.

11. The method as recited in claim 1, wherein the list is not sorted, and an item indexed by the desired grouped index is a first one in the list that is indexed by the desired grouped index.

12. The method as recited in claim 11, wherein a next item scrolled on is not immediately following the item indexed by the desired grouped index.

13. A remote controller for scrolling a large list of items, the remote controller comprising:
    a display screen;
    a user interface to scroll by a user touch;
    a screen driver configured to display the list on the display screen;
    a memory for storing code;
    a network interface for wirelessly controlling another device;
    a processor executing the code to perform operations of:
    displaying on the display screen an indexing display that includes a plurality of grouped indexes, each of the grouped indexes corresponding to items in the list of items that share one or more common characteristics, wherein the indexing display is displayed in relation to the list of items;

facilitating a user scrolling on the user interface through the indexing display to select a desired grouped index; and responsive to selecting the desired grouped index, displaying on the display screen an updated list of items based on the desired grouped index to show items in the list of items corresponding to the desired grouped index and at least one item corresponding to an unselected grouped index, wherein displaying the updated list of items includes highlighting either a first item or a last item in the desired grouped index, and wherein, when the first item in the desired grouped index is highlighted, then the at least one item corresponding to an unselected grouped index includes a last item in a preceding grouped index, and, when the last item in the desired grouped index is highlighted, then the at least one item corresponding to an unselected grouped index includes a first item in a following index, and wherein selection of an item is used by the remote controller to configure the playback device to play the selected item.

14. The remote controller as recited in claim 13, wherein an item indexed by the desired grouped index is indexed by any one of the one or more indexes associated with the desired grouped index.

15. The remote controller as recited in claim 13, wherein the list is sorted and an item indexed by the desired grouped index is a first one of a group of items indexed by the desired grouped index.

16. The remote controller as recited in claim 15, wherein a next item scrolled on is immediately following the item indexed by the desired grouped index.

17. The remote controller as recited in claim 13, wherein the list is not sorted, and an item indexed by the desired grouped index is a first one in the list that is indexed by the desired grouped index.

18. The remote controller as recited in claim 17, wherein a next item scrolled on is not immediately following an item indexed by the desired grouped index.

* * * * *